Feb. 22, 1966    J. E. LINDBERG, JR    3,237,179
HEAT DETECTION DEVICE WITH TEST SYSTEM
Filed July 13, 1961    5 Sheets-Sheet 1

INVENTOR.
JOHN E. LINDBERG, JR.
BY Owen, Wickersham, & Erickson
ATTYS

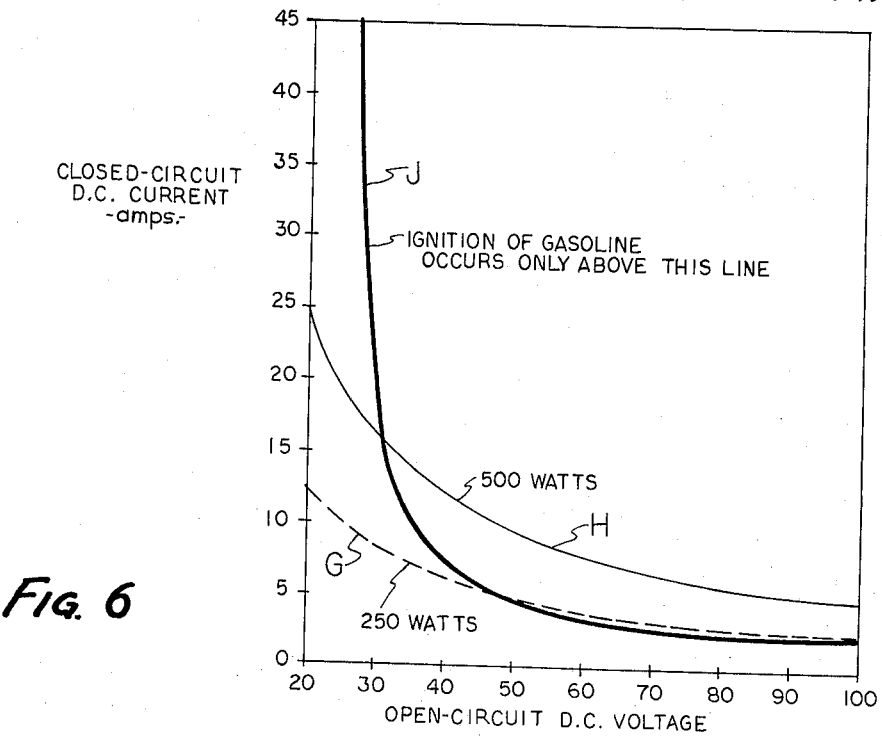
FIG. 6
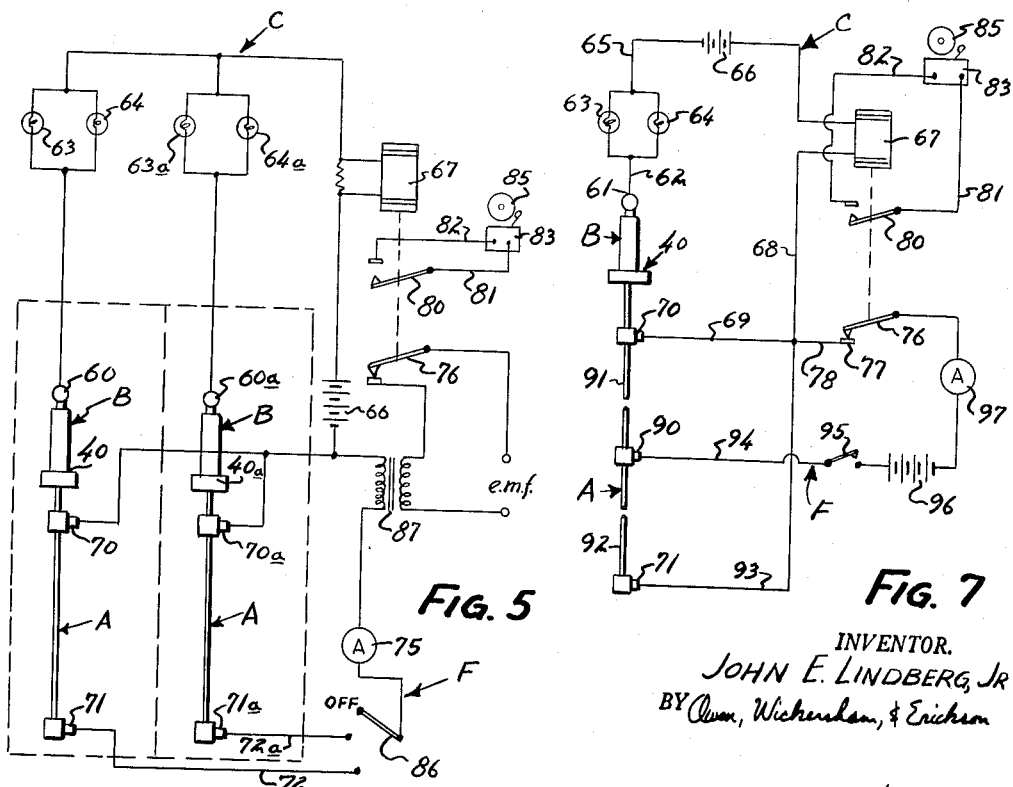
FIG. 5
FIG. 7
INVENTOR.
JOHN E. LINDBERG, JR

Feb. 22, 1966  J. E. LINDBERG, JR  3,237,179
HEAT DETECTION DEVICE WITH TEST SYSTEM
Filed July 13, 1961  5 Sheets-Sheet 3

INVENTOR.
JOHN E. LINDBERG, JR.
BY
Owen, Wickersham, & Erickson
ATTY'S

INVENTOR.
JOHN E. LINDBERG, JR
BY
Owen, Wickersham, & Erickson
ATTY'S

INVENTOR.
JOHN E. LINDBERG, JR.

United States Patent Office 3,237,179
Patented Feb. 22, 1966

3,237,179
HEAT DETECTION DEVICE WITH TEST SYSTEM
John E. Lindberg, Jr., 1211 Upper Happy Valley Road,
Lafayette, Calif.
Filed July 13, 1961, Ser. No. 126,437
26 Claims. (Cl. 340—214)

This invention relates to an improved apparatus for heat detection and especially fire detection. More particularly it relates to a heat detection system having complete test means and a novel responder means.

The present invention is an improvement of the apparatus described and claimed in my copending application, Serial No. 102,622, filed April 10, 1961, now abandoned. That application provides a novel non-electric heat-detecting element or sensor located in a heat-detection zone and connected outside the zone to an electrical warning or corrective system by a novel instrument called a responder. The sensor may be filamentary—a long, very narrow-diameter, hollow tube, which may extend along a line, around a circle, or along any desired path and for practically any desired length. Also, the actual alarm or heat-condition indicator can be connected to the responder by a wire of practically any desired length. For example, the heat-detecting sensor may be inside a house, the responder just outside the house, and the indicator at the fire station. Or, the non-electric heat-detecting sensor may be in zone 1 of an aircraft engine ahead of a fire wall, the responder may be behind the fire wall, and the indicator may be on the aircraft instrument panel.

Conventional fire detectors employed in aircraft for zone-1 fire detection, whether of the continuous type or of the single-point type, have been liable to give false alarms. For example, a prevailing type of continuous fire detector is actuated by the change in electrical resistance of semi-conducting materials caused by a change in environmental temperature. Moisture, however, can produce the same effect as high temperatures. Moisture conditions in the engine chambers, where zone-1 detectors are located, vary considerably, because changes in altitude radically affect the temperature and pressure conditions there. As a consequence, moisture condensation occurs frequently and has often caused these electrical fire-detectors to develop low-resistance shorts that resulted in false alarms. False alarms are serious enough on the ground, as everyone knows, but in aircraft they are unforgivable, because the crew must immediately take hazardous and expensive emergency action.

The present invention solves the false-alarm problem. Like the device described in application Serial No. 102,622, the sensor is never actuated by moisture or by atmospheric conditions. In addition, it includes an improved circuit and a greatly improved testing apparatus.

Such troubles as poor electrical connections at the joints between successive elements of continuous-type detectors, and the accumulation of foreign material in the connections, both leading to heating at the joints, cannot occur in this invention. My invention uses only the simplest electrical connections.

Some prior-art types of fire detectors have given false alarms because they responded to the rate of change of temperature rather than, or in addition to, a predetermined high temperature level. Consequently, during airplane takeoff, when the temperature in the power-plant area was increasing very rapidly, these detectors sometimes gave false alarms when everything was normal. The same thing happened during rapid climbing and some other operating conditions. The device of this invention is not affected by the rate of change of temperature; so another source of false alarms is eliminated.

Prior-art continuous-type fire detectors also gave false alarms whenever the detector element was seriously damaged, because short circuits were then caused within the element. The sensor of the present invention can be completely severed, cut open, dented, or bent in any fashion without causing a false alarm.

A very important object of the invention is to provide means for giving a complete test of the unit. The test is positive: if the test shows that the unit will work, it will work, and if it shows that the unit will not work, it will not work.

An outstanding feature of the invention is that the warning circuit can be operated at very low impedance, often less than one ohm. This feature greatly increases the reliability of the system, for this impedance is so low that, especially when the circuit is used with high-amperage currents, complete immersion of the circuit in salt water does not seriously affect its operation.

Another object of the invention is to provide a fire detector substantially lighter in weight-per-length than previous fire detectors, an important feature because every pound saved in equipment means that additional payload is available. In modern transport aircraft, each pound saved in manufacture is considered to be worth about sixty to one hundred dollars. The fire detector of the present invention weighs only about one-seventh as much as the lightest comparable prior-art detectors.

A further object is to provide a fire detector capable of indefinitely recycling to give warning each time a critical elevated temperature is reached and to withdraw the warning each time the temperature drops.

Another object of the invention is to provide means for testing other types of fire detecting systems.

Another object is to provide a fire-detection system which avoids the complexities characteristic of other fire detectors. For example, no amplifiers need be used in this system.

Another object is to provide a completely hermetically sealed heat-detection transducer, completely free from environmental errors caused by such things as pressure and altitude changes, moisture condensation, and so on.

Another object is to provide a responder having unusually good response characteristics and, in particular, an accelerated snap action.

Another object of the invention is to enable the use of several non-electric heat-detecting transducers in combination with a single electrical circuit, to achieve simplicity while still pinpointing which transducer has been actuated.

Other objects and advantages of the invention will appear from the following description of some illustrative embodiments thereof.

In the drawings:

FIG. 5 is a view similar to FIG. 2 of a circuit containing a plurality of responders and sensors.

FIG. 6 is a graph showing the relationship of D.-C. voltage in the open circuit to the closed-circuit D.-C. current.

FIG. 7 is a circuit diagram of a modified form of circuit.

Figure 1:
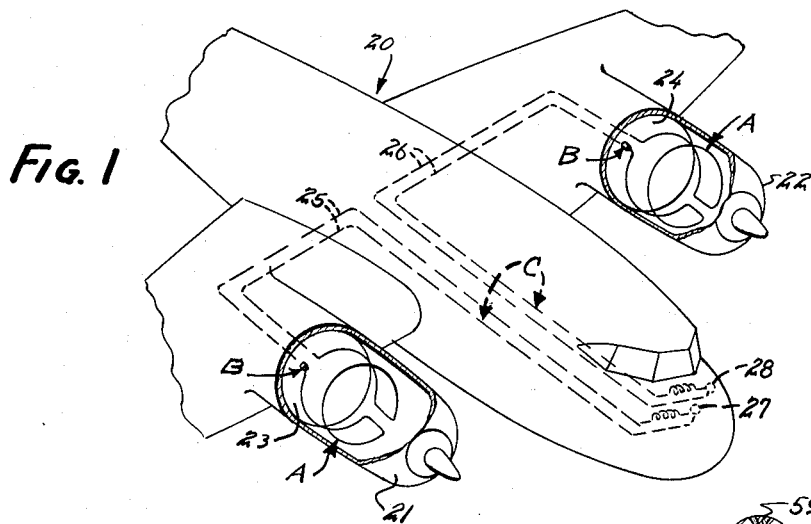
FIG. 1 is a diagrammatic fragmentary view in perspective of a portion of an aircraft containing a fire-detection and warning device embodying the principles of this invention.

As shown in FIG. 1, the fire-detection system of this invention preferably comprises (1) a non-electric detection means, preferably in the form of a generally filamentary sensor A of some desired length, (2) a responder B, and (3) an electrical circuit C. The function of the sensor A is to actuate the responder B, which in turn actuates the electrical circuit C. Thus, the sensor A constitutes a heat-to-pressure transducing means, while the sensor A and the responder B, considered together, comprise a heat-to-electric-current transducer.

The sensor A may be further defined in general terms (see FIGS. 3 and 4) as a generally filamentary enclosure D of extended length connected to the responder B and containing means E responsive to heat in the environment of the sensor A, for raising the internal pressure in the responder B. The responder B is a type of pressure-actuated electrical switch that opens or closes in response to the pressure changes induced by the response of the sensor A to heat. The electrical circuit C may be a warning circuit or a remedial circuit.

The system of this invention has many features especially suitable to use in aircraft. Just to give a general picture that can be referred to from time to time, FIG. 1 presents an aircraft 20 in which two systems of this invention are installed. Two sensors A are used, one for each of two engine nacelles 21, 22 of this airplane 20. The sensors A are disposed at critical locations in the nacelles 21, 22, usually around the engines, and the responders B are mounted on the fire walls 23, 24. The circuits C include conductors 25, 26 leading to respective lights 27, 28 on an instrument panel. Fire at either engine nacelle 21 or 22 heats the sensor A therein and causes its associated responder B to close its associated circuit C, thereby lighting the light 27 or 28.

The sensor A includes a narrow-diameter metal tube D of constant cross-sectional area and of any desired length. Within this tube D is means E responsive to the temperature of the tube D for varying the pressure inside the tube or enclosure D. This means E may also be termed a transducing agent or a gas-transfer or gas-emitting agent. The enclosure D is gas-tight and its only opening is connected to the responder B, which itself defines a closed chamber connected to the enclosure D. An alteration of the internal pressure within the enclosure D therefore affects the internal pressure within the responder B.

This invention preferably employs the transducing agents E that retain gas at low temperatures and emit gas progressively over a wide range of elevated temperatures. They are set out in detail in my copending application, Serial No. 102,622, to which reference may be had for complete details. These transducing agents E release or emit large volumes of gases or vapors when elevated to a temperature sought to be detected and take them up again when the temperature is reduced.

Among suitable materials for the transducing agent E are many metallic hydrides. With the alkali and alkaline earth metals, i.e., groups I–a and II–a of the periodic table, hydrogen forms stoichiometric compounds such as sodium hydride and calcium hydride. These are ionic in behavior, with hydrogen as the negative ion. The reactions are reversible and exothermic. Specifically, hydrogen reacts with lithium, sodium, potassium, rubidium, cesium, calcium, radium, strontium, francium, and barium, in stoichiometric proportions to form hydrides. With the elements of Groups III–a (including the rare earth and actinide elements), IV–a and V–a, hydrogen forms pseudo-hydrides. The solubility of hydrogen in elements of these groups varies as the square root of the pressure, and it decreases with increase in temperature. Above about 300° C., palladium also behaves in this way. Elements of these groups are designated as "Group B," the class consisting of scandium, titanium, vanadium, ytterbium, zirconium, niobium, hafnium, tantalum, the rare earth metals (atomic numbers 57 through 71), and the actinide metals (atomic numbers 89 through 103), palladium being a member of this group at temperatures greater than about 300° C. This solution is commonly termed a "hydride," though it is not a stoichiometric compound.

My co-pending application, Serial No. 102,622, illustrates a few of the many ways in which the sensor A may be constructed. Transducing agents E may be used in a filamentary, pellet, or granular form, always being placed inside the sensor tube D, which is a non-porous electrically conductive tube, preferably of constant cross-sectional area. Suitable metals are nickel, pure iron (which is impermeable to many gases), stainless steel, and molybdenum, for example. In any event, the inner surfaces of the tube D should not react with the materials it contacts, including the gas involved. A typical sensor tube D is preferably about 0.040" to 0.060" outside diameter with a wall thickness of preferably about 0.05" to 0.015". Such tubes D are preferably about two to thirty feet long, although they may be longer or shorter.

Figure 4:
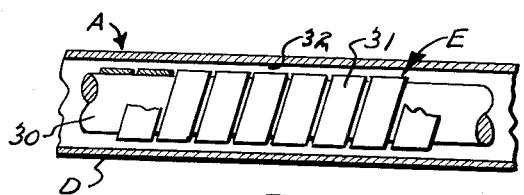
FIG. 4 is a greatly enlarged view in elevation and in section of a portion of one preferred form of heat-detection sensor.

FIG. 4 shows a preferred form of transducing agent E enclosed in the sensor tube D. Here the transducing agent E is a filament 30, such as zirconium or titanium or calcium wire and may be about 0.025" to 0.050" in diameter, for example. A ribbon 31 of suitable material, such as molybdenum, preferably about 0.020" wide and 0.002" thick, is wrapped tightly around the filamentary transducing aegnt 30. The ribbon 31 physically spaces the filament 30 from contact with the walls 32 of the tube D and prevents the transducing agent 30 from fusing or welding to the tube walls 32, even in the event that the sensor A is exposed to extreme heat and even if the filament 30 is fully ingassed, so that it is enlarged to nearly the internal diameter of the tube D.

As a simplified example of installation of the sensor A of FIG. 4 to the responder B, one end 33 (FIG. 3) of the tube D may be connected by a gas-tight seal to the responder B, while the other end 34 of the tube D is still open. This free end 34 may be connected to a vacuum pump and the tube D pumped free of gas. Then the tube D is heated, and then pure hydrogen is forced in through the free end 34, the zirconium filament 30 absorbing the hydrogen while it cools. The originally pure metal 30 is converted into an ingassed hydride. The free end 34 is then sealed off as by inserting a wire 35 and fusing it to the tube D, and the device is ready for operation.

Figure 3:
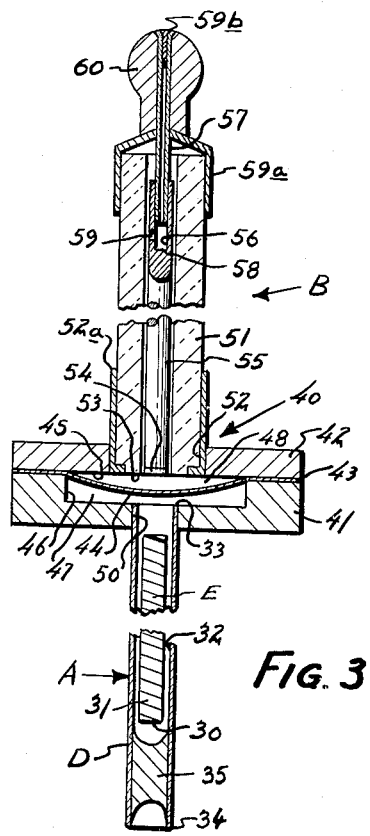
FIG. 3 is a further enlarged view in elevation and in section of the novel responder of FIG. 2, showing also a portion of the sensor.

FIG. 3 shows one preferred form of responder B. This responder B comprises a unit 40 and has two circular plates 41 and 42, of non-porous metal, preferably molybdenum or "Kovar," between which is bonded (as by brazing) a thin metal (e.g., molybdenum or "Kovar") flexible disc of diaphragm 43. (According to Handbook of Material Trade Names, 1953 Edition, published by Industrial Research Service at Dover, New Hampshire, "Kovar" is a registered trademark for an alloy of 20% nickel, 17% cobalt, 0.2% manganese, and the balance iron.) The plates 41 and 42 are hermetically sealed together and are in electrical contact for their full peripheries and over a substantial margin, but in the center the diaphragm 43 has a generally spherical-segment depression 44 called a "blister," which is free to move relative to the plates 41 and 42 and constitutes the active or movable part of the diaphragm 43. Use of a diaphragm with a blister 44 makes possible the use of an upper plate 42 with a planar lower surface 45 and gives a more predictable response, but other diaphragm structures may be used where feasible. The lower plate 41 is formed with a recess 46 in its upper surface, and the diaphragm 43 divides the resultant cavity between the plates into two regions or chambers 47 and 48. Since the lower region 47 communicates with the sensor A, it may be called the "sensor chamber." The other region 48 is located on the opposite side of the diaphragm 43 from the sensor A; so it may be called the "anti-sensor chamber." Of course, either plate 41 or 42 may actually be made by brazing together several thin plates of the desired configuration, and the recess 46 may be provided by using a stack of preformed thin washers over a disc.

The end 33 of the sensor tube D is joined to and hermetically sealed to the lower plate 41, fitting within a hole 50. The region 47 is closed and sealed except for its communication with the lumen of the sensor tube D; so the inside of the sensor A and the sensor chamber 47 enjoy a common atmosphere to the exclusion of any other.

A tube 51 of non-porous ceramic material or other non-porous electrically-insulating material extends through a stepped opening 52 provided by a metal tube 52a that is brazed into the upper plate 42 flush with the surface 45, the tube 51 being hermetically sealed in place with its lower end 53 flush with the bottom surface 45 of the plate 42. The hole 52 and tube 51 are preferably centered with respect to the blister 44. A metal electrode tip 54, preferably of palladium or other metal that actively outgasses hydrogen when heated in the temperature range involved is provided as the lower end of a metal rod 55, preferably of molybdenum, inside the tube 51, the electrode 54 being a contact portion of the rod 55 that lies flush with (or very slightly below) the lower surface 45 of the plate 42.

If sufficient pressure is applied to the sensor side of the blister 44, the blister will be deflected and will make contact with the electrode portion 54, and if the deflecting force is removed, the restoring force of the blister 44 will return it to its relaxed position and thus break contact with the electrode portion 54. The force necessary to deflect the blister 44 may be chosen by proper design to accommodate a wide range of values.

The outer end of the molybdenum rod 55 is drilled axially to provide a receptacle 56 within which fits the end of a nickel capillary tube 57, which is secured to the rod 55, as by a cuplat braze, at a location short of the lower end 58 of the receptacle. A hole 59 extends radially through the wall of the receptacle 56 in between the receptacle end 58 and the end of the tube 57. A cap 59a, preferably of "Kovar" or molybdenum, is brazed to the ceramic tube 51 and to the capillary tube 57, and the lengths of the tubes 51 and 57 and the rod 55 are carefully chosen to match the coefficients of expansion and the lengths of the two metal members 55 and 57 to the coefficient of expansion and the length of the member 51. It is important to keep the lower end 54 of the contact rod 55 from moving above the surface of the plate 42. With the relative lengths of the molybdenum and nickel parts chosen so that their expansion and contraction exactly cancel those of the ceramic tube 51, whose coefficient of expansion lies between those of nickel and molybdenum, this distance is easily maintained.

The cylindrical rod 55 of molybdenum fits fairly snugly into the bore of the ceramic tube 51, while still leaving sufficient clearance for gas passage. The radial hole 59 enables passage of hydrogen gas or a mixture of hydrogen and a noble gas, such as argon or neon, through the capillary tube 57 into the ceramic tube 51. Hence, the nickel tube 57 may be used to introduce gas under pressure into the anti-sensor chamber 48 to provide any desired pressure there, with resultant effect on the response characteristics of the blister 44. It may then be closed off by inserting a wire 59b in its outer end and brazing it to the tube 57. Then the tube 57 may be brazed to an electrical jack or socket member 60. Thus, when the blister 44 contacts the electrode 54, electric current can pass from the blister 44 to the rod 55, the tube 57, and the socket 60, to which the electric warning circuit C is connected.

Figure 2:
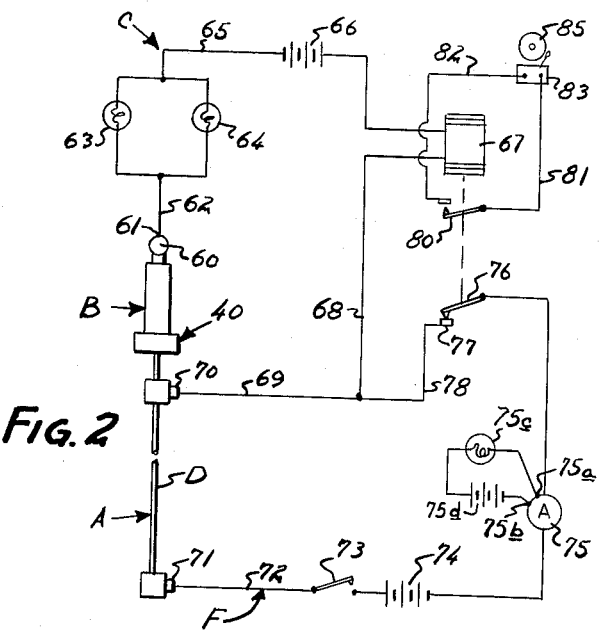
FIG. 2 is an enlarged view in elevation and partly in section of a fire detection system as used in FIG. 1, showing the responder, a heat detection sensor broken in the middle in order to conserve space, and a circuit diagram.

A preferred electrical warning circuit C is shown in FIG. 2. It will be seen that a connector 61 engages the socket 60 and from it a lead 62 extends to two lamps 63 and 64 in parallel with each other and in series with the lead 62 and a lead 65, which leads to one side of a battery 66. The other side of the battery 66 leads through a relay 67, and, by leads 68 and 69, is connected to a terminal 70 on the sensor tube D, near the responder B.

A test circuit F is also provided. A second terminal 71 on the far end of the sensor tube D is connected by a lead 72 to a test switch 73, which is connected to a second battery 74. The other side of the battery 74 is connected through an ammeter 75 to one pole 76 of the relay 67. The pole 76 is normally closed against a contact 77 that is connected by a lead 78 to the leads 68 and 69. A second pole 80 connects and disconnects leads 81 and 82 of a bell relay 83. The body D of the sensor A is a good electrical conductor, so that even with many feet of it the total resistance will be low, only about one to ten ohms. Thus an ungrounded circuit is provided through the sensor body D between the terminals 70 and 71.

When the blister 44 is not in contact with the electrode 54, the circuit through the battery 66 is open, and it cannot light the lamps 63 and 64 or ring the bell 85. Whenever there is a fire or heat condition such as to emit sufficient gas inside the sensor A, the pressure in the sensor chamber 47 builds up and closes the blister 44 against the electrode 54, closing the circuit through the battery 66 and lighting the signal lamps 63 and 64 and ringing the bell 85.

A novel feature of the responder 40 is that the electrode tip 54 is of metal hydride or metal with dissolved hydrogen gas that emits that gas when heated; therefore, after a blister in contact with the tip 54 begins to move away from the tip, if it moves so slowly as to cause arcing, the resultant heat causes the palladium or other "hydride" to emit hydrogen, thereby increasing the gas pressure in the anti-sensor chamber 48 and snapping the blister 44 away from the electrode tip 54.

While the two-lamp, one-bell circuit is preferred, it will be apparent that, instead, there may be only a single lamp. The important thing is that there is an ungrounded circuit with a warning device in series with the responder B and sensor body D. That is, in essence, the warning circuit C. Two 2.5 volt lamps 63 and 64 and a 2.5 volt bell 85 are preferred to a single lamp to help get a high-current, low-voltage circuit, which is trouble free, because of the current-voltage values and because even when one lamp burns out, another is present to give the warning.

Figure 13:
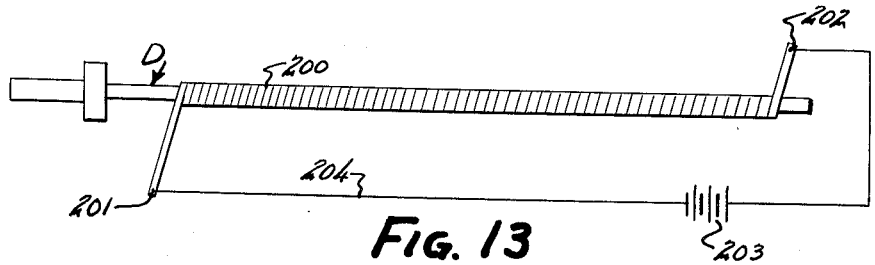
FIG. 13 is an enlarged view in elevation of a portion of a modified form of heat-detection sensor.

For testing the circuit of FIG. 2, the switch 73 is closed. The sensor element E is then heated electrically by the current passing from the battery 74 directly through the metal tube D. I may, however, use other means for heating the tube D and the sensor E electrically, and one such method will be discussed later with reference to FIGS. 13 and 14. The heat is uniformly distributed along the sensor A, which normally contains a noble gas (such as neon or argon) in addition to the hydride E. The sensor A may be adjusted so that if all of it is above a certain critical temperature, the expansion of the noble gas itself will suffice to move the blister 44 against the electrode tip 54. This temperature may be termed the "all-point." Then, if most of the sensor A is below this all-point, the responder B may still be actuated by a rise of a portion thereof above the gas-emission point of the hydride E, by a desired amount. For testing, the all-point may be used, and when the temperature of the sensor A reaches the all-point temperature for which it has been set, the responder B completes the alarm circuit, lighting the warning lamps 63 and 64 and actuating the relay 67. The relay 67 then breaks the current in the test circuit by moving the pole 76 away from the contact 77. With the flow of current in the test circuit F stopped, the sensor A cools off, finally reaching the point at which the responder B opens the alarm circuit, releasing the relay 67. This restores the flow of current in the test circuit F, so that the sensor A again heats up. The cycle is repeated as long as the test switch 73 is kept closed.

The intermittent flashing of the warning lights 63, 64 during the test indicates that the system is in good order. If there is a break in the sensor A or a fault in some other part of the system, the warning lamps 63, 64 will not light during the test, indicating that something is wrong with the system. Since it is the gas pressure in the sensor A which actuates the responder B during the test cycle, this test method gives a true test of the entire fire detector system by producing actual high temperature conditions in the sensor.

The test switch 73 may be kept closed at all times during flight, giving a continuous test, without in any way hampering the unit's effectiveness as a fire detector. If a fire condition exists in the vicinity of the sensor A, then the responder B keeps the alarm circuit C closed, and the warning lamps 63, 64 burn continuously, indicating an excessive temperature condition. During the time the system is indicating a fire, the relay 67 prevents current from flowing in the test circuit F. Actually, the continuous use of this test circuit F may improve the response rate of the detector; since the sensor is maintained at a fairly high temperature all the time, it takes less time for a fire to heat the sensor A up to the point at which it gives a warning.

The environmental temperature of the sensor A determines how long it takes for the sensor A to heat up when the test current is on and to cool off when the test current is off. The higher the environmental temperature is, the shorter the heating-up time and the longer the cooling-off time. Therefore the average current, averaged over each test cycle, decreases as the environmental temperature is raised. If an ammeter 75 with a long time-constant (highly damped) is placed in series with the test circuit F, as shown in FIG. 2, it will perform the proper averaging and can be calibrated to read the actual environmental temperature of the sensor directly.

If it is desired that a warning be given when the environmental temperature reaches some overheat point below the all-point temperature, the ammeter 75 may be fitted with contacts 75a and 75b so that an external warning circuit 75c including a battery 75d is closed when the current indicated by the meter 75 drops below that corresponding to the overheat temperature. Meters fitted with such contacts are commercially available.

If the fire detector is faulty for some reason, then the relay 67 in the alarm circuit C will not break the current in the test circuit F. The average current indicated by the ammeter 75 will then rise to a high value, indicating that the system has failed. If desired, the additional set of contacts 75a and 75b may be set to close the external circuit 75c when the current indicated by the meter 75 exceeds a certain value, in order to give a warning that there is a fault in the system, or two sets of such contacts may be provided.

If several zones are to be monitored simultaneously, the arrangement of FIG. 5 may be used, wherein the test circuit F can be switched to include each detector in turn. FIG. 5 shows a multiple-position switch 86 which connects power from a transformer 87 alternately to either line 72 or line 72a. (Corresponding numerals on the second detector are indicated by adding "a" to the reference numeral.) While the switch 86 may be operated manually, the switch 86 is preferably an automatic stepping switch (models of which are commercially available) so that each detector is automatically connected into the test circuit F in sequence. If either an overheat condition or a fault exists in any of the zones, the appropriate warning is given when that zone is tested in the sequence. Otherwise the stepping switch 86 keeps on sweeping through the several zones with the flashing warning lamps 63, 64 and 63a, 64a indicating that everything is in order. Appropriate known circuitry can be arranged so that the stepping switch 86 will stop if any zone indicates a failure or an overheat condition; then it will not resume sweeping until the singular situation is noted by the operator and he starts the stepping switch 86 going again.

Figure 8:
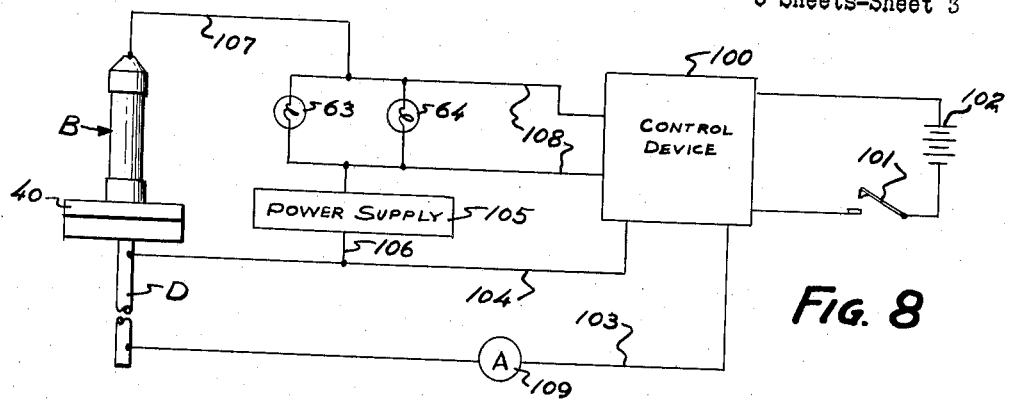
FIG. 8 is a view similar to FIG. 2 showing the circuitry of a fire detection system according to the invention with a box labeled "control device" to indicate alternate forms of switching controls which may be used.

Although I have used a simple relay 67 in the embodiment shown in FIG. 2, the principles of my invention may be applied equally as well where other suitable types of control devices are used in place of the relay 67. In FIG. 8, a simplified circuit is shown with a box 100 marked "control device" connected in parallel with the lights 63 and 64. The control device 100 may be any suitable type of electrical relay or switching device such as a vacuum tube or transistor amplifier, or it may be a magnetic amplifier. I may also use as the control device a relay of the type described in my co-pending application Serial No. 29,397, filed May 16, 1960, now abandoned.

To commence a cycle in the circuit shown in FIG. 8, the switch 101 is closed and the control device 100 allows current to flow directly from a battery 102 through the control device 100 and its output leads 102 and 104 to heat the sensor tube D. When the sensor tube D gets hot enough to actuate the responder B, it moves the responder diaphragm in the manner as described previously, which completes a circuit from a battery or suitable power supply 105, through a lead 106, the responder B, a lead 107 and the signal lamps 63 and 64. Power is simultaneously supplied at this time through leads 108 to the control device 100, causing it to react and to stop the flow of current through the output leads 103 and 104 to the sensor tube D. When the sensor E cools, the responder B breaks the circuit through the lamps 63 and 64 and stops the flow of current in the leads 108 to the control device 100. The control device thus reacts and again permits current to flow through the sensor tube D, repeating the cycle. An ammeter 109 is connected in the lead 103 to provide a constant.

When the switch 101 is open, there is no power available for heating the sensor tube D and so the system does not cycle. However, it still functions as a fire detector since the closing of the circuit by the responder B allows current from the power source 105 to flow in lead 106 and through the responder B, lead 107, and the lamps 63 and 64.

Figure 9:
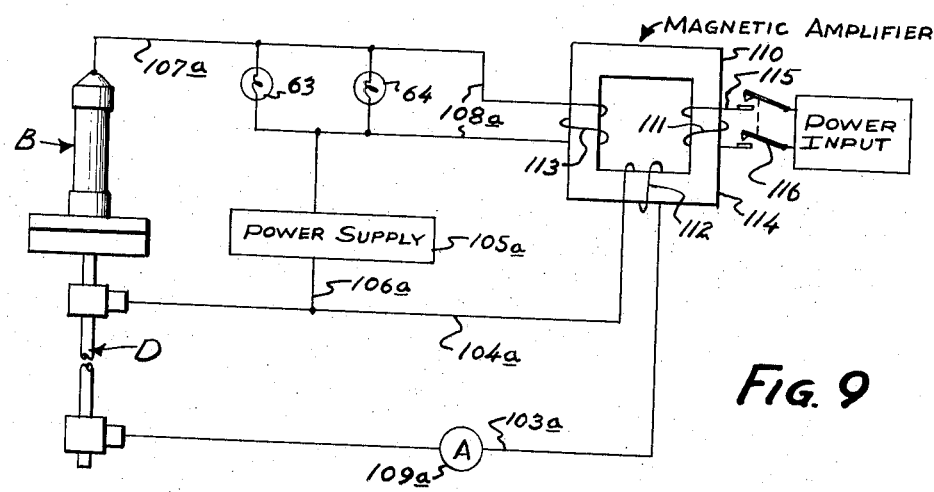
FIG. 9 is a view of the fire detection circuitry according to the invention as shown in FIG. 8, with a magnetic amplifier as the control device.

The embodiment of FIG. 9 utilizes the basic circuit of FIG. 8 with a modification to include a magnetic amplifier 110 as the control device. The magnetic amplifier 110 may be of any suitable well known type and, as shown schematically, it comprises an input winding 111, and output winding 112, and a control winding 113, all of which are oriented relative to a saturable core 114. The input winding 111 is connected by means of a pair of leads 115 having an on-off switch 116 to a suitable A.-C. power supply 17, (e.g., 400 cycle). The output winding 112 is connected by means of leads 103a, 104a across the sensor tube D, and an ammeter 109a is connected in the lead 103a. When no current is flowing in the warning circuit, i.e., when the circuit through the responder B is open, there is no current flow in the control winding 113 and power can be induced from input winding 111 to the output winding 112 since the transformer 110 is running below saturation. However, when the switch 116 is closed, current is supplied by the output winding 112 through leads 103a, 104a to the sensor tube D. The sensor tube D is heated, and the responder B closes the circuit through the power supply 105a, the leads 106a and 107a and the lamps 63 and 64. Simultaneously, current is supplied through the leads 108a to the control winding 113. This saturates the core 114 of the transformer 110 and stops the flow of current from the input winding 111 to the output winding 112. Thus, with no current in the output winding, the sensor tube D cools until the responder B breaks the circuit to the control winding 113 at which time the cycle commences again.

Therefore, under normal operating conditions, the systems of FIGS. 8 and 9 will continue to perform their test cycles while providing constant indications of the proper system functioning by the lights 63 and 64 and the ammeters 109 and 109a.

The use of an electrical amplifier, either the transistor or tube type or the magnetic amplifier shown in FIG. 9, eliminates all moving parts from the fire detector and test system of the present invention and also the malfunctioning problems inherent with automatic relays and switches. This feature is very important in the aircraft industry where all moving parts are considered to be potential sources of unreliability.

Figure 10:
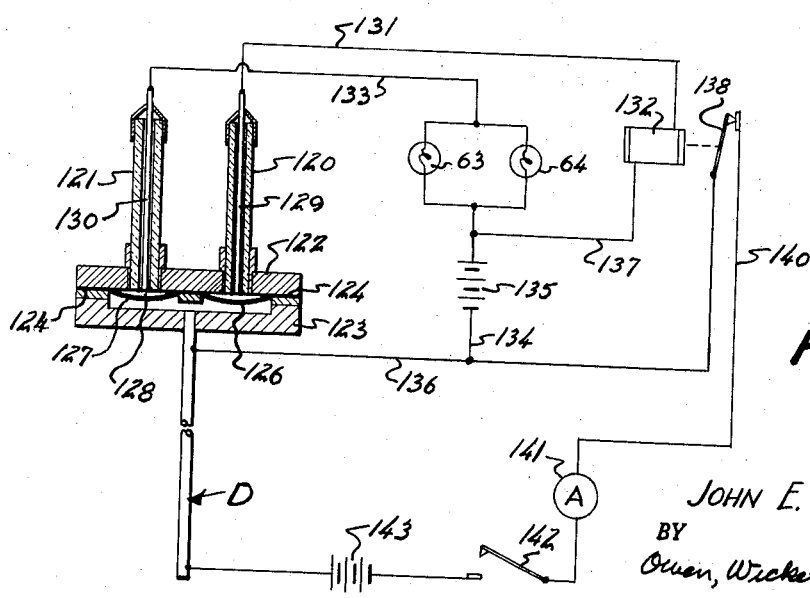
FIG. 10 is a view similar to FIG. 5 showing another modified form of circuit according to the principles of the invention.
Figure 11:
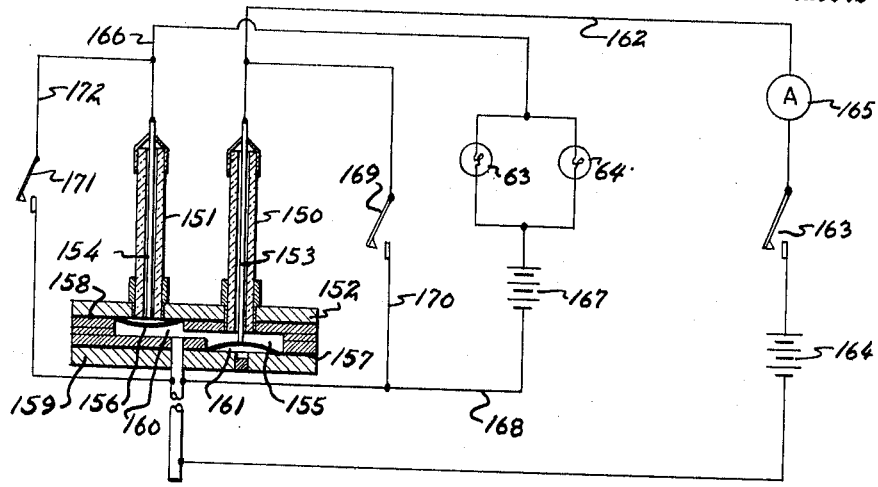
FIG. 11 is a circuit diagram of another modified form of the invention similar to FIG. 10.

In other embodiments of the present invention, as shown in FIGS. 10 and 11, I may use a pair of combined responders of the type (B) previously described above, one responder being used to control a heating circuit of the sensor tube D and the other being used to control an alarm circuit. This arrangement has many advantages, among which is an improved life expectancy and hence greater reliability for the unit. The cycling condition in such an arrangement is set independently of the alarm, so that a unit can be made to cycle with the sensor tube D alternately heating and cooling but with the signal lamps 63 and 64 remaining dark until a fire occurs. A suitable signal may then be incorporated in the cycling circuit if desired to show that the unit cycles properly.

In FIG. 10, one version of the aforementioned responder system is shown with first and second insulating tubes 120 and 121 (similar to the tube 51 of FIG. 3), which are attached in an upper plate 122 that is fixed to a second lower plate 123. Between the plates 122 and 123 is retained a diaphragm 124 having two blister portions 126 and 127 which are located directly below the tubes 120 and 121 and which are made to respond to different amounts of pressure. The lower plate 123 forms a single sensor chamber 128 below both of the blisters 126 and 127. As stated above, the tubes 120, 121 are preferably constructed in the same manner as the responder B in FIG. 3 and are equipped with internal conducting rods or contact members 129 and 130. The lower plate 123 is sealed to the sensor tube D.

The rod or contact 129 in the first insulated tube 120 of the dual responder system of FIG. 10 is connected by a lead 131 to a relay 132 or some suitable control device and a lead 133 extends from the rod or contact 130 of the second tube 121 to the pair of parallel connected lamps 63 and 64. Extending from the lights 63, 64 is a lead 134 containing a battery 135 or a power source and which is connected to a lead 136 connected to the end of the sensor tube D nearer the responder. A lead 137 is connected between the lead 134 and the relay 132. The relay 132 controls a normally closed switch arm 138 attached to the lead 136, which opens and closes against a contact point 139 at the end of a lead 140 that is connected to the end of the sensor tube D farther from the responder. The lead 140 contains an ammeter 141, to show current flow to the sensor tube D during the testing cycle, an open-close switch 142, and another suitable power source such as a battery 143.

In operation, the switch 142 is turned on to supply current from the battery 143 through the lead 140 and thereby heats the sensor tube D. The heating of the sensor causes the first diaphragm blister 126 to close and make contact with the rod 129 of the first responder tube 120. This closes the circuit through the leads 137, 134, 136, and 131, and supplies current from the battery 135 to the relay 132. The relay 132 then operates to open the switch arm 138, which shuts off current to the sensor tube D and thus stops the heating. When the sensor cools, the relay 132 closes the switch arm 138 again to start another cycle.

In the arrangement shown in FIG. 11, first and second responder tubes 150 and 151 are fixed to an upper plate 152, but the first responder tube 150 has a contact 153 which normally touches an upwardly curved blister 155 of a diaphragm 157 attached between the upper plate 152 and a lower plate 159. The lower plate 159 forms a sensor cavity 160 with the upper plate 152 and also provides an anti-sensor cavity 161 for the blister 155. The contact 153 of the first insulating tube is connected by a lead 162 to the end of the sensor tube D farther from the responder, and connected in series in the lead 162 is an on-off switch 163, a power supply source 164, and an ammeter 165. The rod 154 of the second sensor tube 151 is connected by a lead 166 to a pair of lamps 63, 64 in parallel and through a battery 167 connected in a lead 168 to the end of the sensor tube D nearer the responder.

The arrangement shown in FIG. 11 requires no auxiliary relay or control device. When the on-off switch 163 is closed, current flows from the battery or power source 164 in lead 162 through the sensor tube D and heats it. When the sensor pressure is high enough to open the diaphragm blister 155, the current flow through the sensor tube D is broken. When the sensor cools, the diaphragm blister 155 closes and again causes heating of the sensor tube D, repeating the test cycle. If a fire causes a greater increase of temperature in the sensor, the diaphragm blister 156 and current will flow through the lead 166, thus lighting the warning lamps 63 and 64. A switch 169 may be placed in a lead 170 between the leads 162 and 168 in order to keep the heating circuit closed and to test the alarm circuit. A similar switch 171 may be utilized in a lead 172 connected between the lead 166 and the sensor tube D in order to check the lamps 63 and 64. Such check means, though not shown, may be used in a similar manner on the circuit of FIG. 10.

Figure 12:
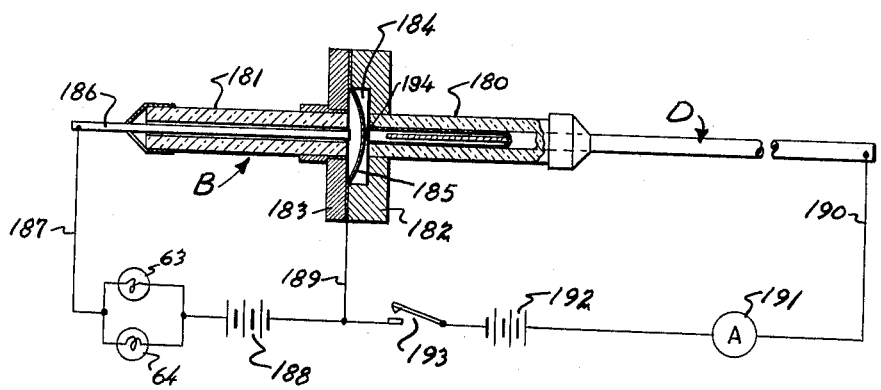
FIG. 12 is a view in elevation of a modified form of the invention using a double acting diaphragm.

FIG. 12 shows another form of my invention in which first and second tubes 180 and 181 of non-conductive material are arranged in axially opposing relationship in a pair of adjacent plates 182 and 183. The plates 182, 183 are connected to form a single central sensor cavity 184 and between them is retained a single insulated diaphragm 185. The first tube 180 is connected directly to one end of a sensor tube D which extends through the tube 180 to the inner wall of the sensor cavity 184. The blister 185 initially is in contact with the end 194 of the sensor tube D. The second tube 181 has the same construction as the responder tube B of FIG. 3 with a central contact member 186 extending from the opposite wall of the sensor cavity 184, to the end of the tube 181 where it is connected with a lead 187. The lead 187 is connected to a pair of lamps 63 and 64 in parallel, a battery or power supply 188 and a lead 189 connected to the diaphragm 185. A lead 190 connected to the end of the sensor tube D farther from the responder is also connected to the diaphragm 185 via lead 189 and contains a battery 191, an on-off switch 192 and an ammeter 193 in series.

The unit of FIG. 12 has several advantages among which are its compact structure and the double duty function of the diaphragm 185. To operate this testing system the on-off switch 193 is closed, causing current to flow in lead 190 and through the sensor tube D, which heats it and creates a pressure against the diaphragm 185 which then moves, to make contact with the rod 186 of the responder tube 181. With the diaphragm 185 against the rod 186, the circuit is completed through the lead 187, causing the lamps 63 and 64 to light. Also, as the diaphragm 185 moves against the contact 186, the heating circuit through the lead 190 is broken, allowing the sensor to cool. When the sensor cools, the diaphragm 185 moves back to its position against the sensor tube D to complete the test cycle.

All of the aforementioned embodiments provide means for heating the sensor D for the purpose of constantly testing its proper functioning. They also provide means for maintaining the sensor at a temperature level which increases its sensitivity and response time in the case of an actual fire. Thus, despite their structural differences, all of these embodiments fulfill the important common objectives of the present invention.

If the fire detector is to be operated in an atmosphere of combustible hydrocarbon vapors such as aircraft fuel, there exists a remote possibility that a spark caused by a short circuit between the current-carrying sensor A and another metallic object might cause an explosion. Tests have been carried out on combustible vapors which indicate that ignition does not occur unless the current in the spark exceeds a certain value which depends on the voltage causing the spark. The results of tests with petroleum vapors are shown in the accompanying graph, FIG. 6. As long as the voltage and current values fall below the solid curve J, there is no danger of ignition of these vapors.

It has been found that a power of 250 watts is required to test a fire detector with an 8-foot sensor by this method. A curve G has been drawn in on FIG. 6 which represents a power of 250 watts; that is, the product of the voltage and the current at each point of the curve is 250 watts. The portion of this curve G which corresponds to voltages below about 40 volts lies well within the safe region with regard to ignition of combustible vapors. In order to obtain a power of 250 watts in a sensor with a voltage of 40 volts or less, the resistance of the sensor A must be not more than 6.4 ohms. An 8-foot sensor, made according to my present design of any of the following materials, would satisfy this requirement:

| Metal: | Resistance of 8' sensor, ohms |
|---|---|
| Inconel X | 5.6 |
| Kovar | 2.2 |
| 321 stainless steel | 4.0 |
| Nickel | 0.4 |
| Iron | 0.5 |

To test a sensor 16 feet in length requires a power of 500 watts. A curve H for 500 watts has also been drawn in on FIG. 6. The safe range corresponds to voltages below about 30 volts, or to sensor resistances less than 1.8 ohms. From the above list, nickel and iron would be satisfactory for such a sensor.

If the arrangement shown in FIG. 7 is used, the requirements on sensor resistance can be relaxed somewhat. In this arrangement a connection 90 is made to the center of the sensor A and the two halves 91 and 92 of the sensor A are operated in parallel during the test. A line 93 from the terminal is connected to the lines 68, 69, and 78 and thus to the contact 77. The contact 90 is connected by a line 94 to a test switch 95 and thence through a battery 96 and ammeter 97 to the switch 76. This circuit is thus basically like that of FIG. 2, but in this way a 16-foot sensor, for example, may be tested without exceeding at any point along its length the voltage or current limits of an 8-foot sensor. Therefore the same materials could be used for this 16-foot sensor as could be used for an 8-foot sensor, namely any of the metals in the above list. Any number of 8-foot sections of sensor may be connected in parallel using an arrangement similar to FIG. 7, and the voltage and current limits for a single 8-foot sensor will still apply to each section.

In FIGS. 2 and 7, batteries 66, 74 and 96 are shown as the sources of current in the alarm and test circuits. Naturally these current sources may instead be transformers operated from some convenient line voltage supply. If transformers are used, the relay in the alarm circuit C and the ammeter in the test circuit F have to operate on alternating current; no other changes are required in the circuit.

The power requirements given above for testing the fire detector will cause a detector with its all-point set at about 575° F. to respond in about five seconds if it is suspended in air and is initially at room temperature, around 75° F. If faster response is desired, the test power must be increased; a power of 1250 watts in an 8-foot sensor will give a response time of about one second.

In order to reduce the amount of power required to heat the sensor tube D in each of the above described embodiments of my invention, I may provide the sensor tube D with an insulated conducting sleeve to carry the current from one end of the sensor tube to the other rather than applying the electrical current to the sensor tube D directly. The advantage of this conducting sleeve is that it enables faster, more efficient heating of the sensor with a smaller amount of current. As shown schematically in FIG. 13, the sleeve is preferably formed on the sensor tube D by wrapping a filament such as a ribbon 200 of high resistance conductive material around the sensor tube D, preferably along its entire length. The ribbon 200 is supplied by power at one end 201 from some suitable source such as a battery 203 connected by a lead 204 to the ends 201 and 202 of the ribbon 200. The resulting current thus creates the heat for testing the sensors according to the invention.

I have discovered that a filament of a high electrical resistance alloy such as "Kanthal" has excellent properties for providing this heating function. "Kanthal" is a high resistance alloy having carbon, chromium, cobalt and aluminum in addition to iron, according to the "Handbook of Material Trade Names" 1953 Edition, supra.

Figure 14:
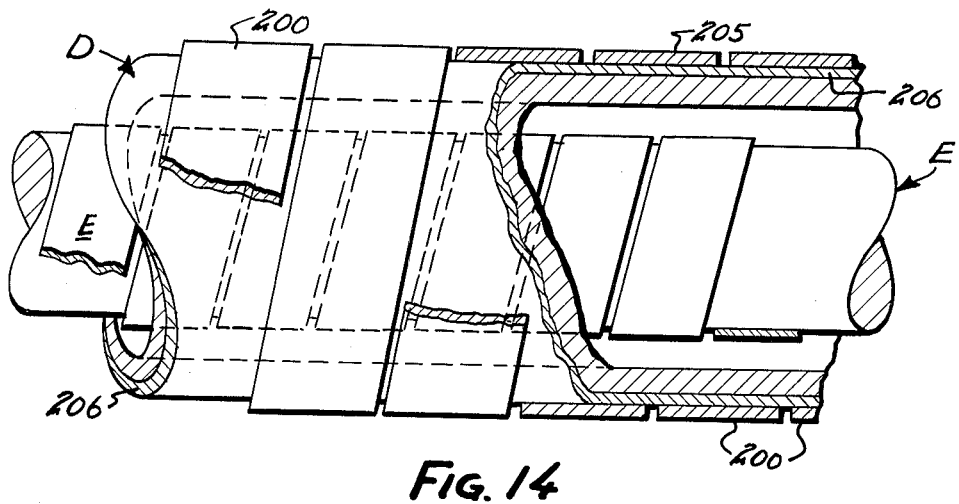
FIG. 14 is a greatly enlarged view in elevation showing a short section of the heat-detection sensor of FIG. 12 in detail.

In FIG. 14 a greatly enlarged section of sensor tube D is shown having an external ribbon wrapping 200. The ribbon 200 may be wrapped with an overlap or with a small amount of space between wraps in essentially the same fashion as the wrapped core of the sensor, as shown in FIG. 4. The "Kanthal" ribbon 200 is very resistant to high temperature and when heated it forms a non-porous oxide coating 205 which protects and insulates it. However, before the ribbon 200 is wrapped around the sensor tube D, an electrical insulation is provided between the tube D and the ribbon 200 by pre-oxidizing the nickel sensor tube D to form a nickel oxide coating 206. This insulates the tube D from the ribbon 200 so that current passes only through the ribbon. Tests have shown that a relatively large amount of heating of the sensor E can be obtained with a low amount of electrical current, and this is an important advantage in many applications of my invention.

The fire-detection system of this invention is practically indestructible. The sensor A may be tied in a knot and beaten on with a hammer without giving a false warning—and it will still detect a fire and the test will show so.

It is virtually impossible for the system to give a false warning—nothing less than an actual fire can cause the detector to give a fire alarm. The system is insensitive to altitude, moisture, and other environmental conditions. It may be immersed with all its terminals exposed in sea water without causing a false warning or impairing its operation. Moreover, this first detector surpasses all of the original F.A.A. specifications (FAA-TSO-C11a; SAE specification AS-401a). In response time, the fire detector of this invention surpasses the original F.A.A. specifications by responding to a 1500° F. flame over an 8-inch section of its sensor in 3.6 seconds. A 2000° F. flame over an 8-inch section of sensor causes an alarm in 2.2 seconds or less. Upon removal of the flame condition, the alarm is cleared in three seconds.

A unique feature of the test system of FIG. 2 is that it may always be depended upon. If the test shows a particular detector to be inoperative, then that detector will not operate and vice versa. This feature ends the uncertainty which arises when a warning is given by a detector which has previously tested bad.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a critical-temperature-detection system having a continuous-type heat detecting sensor of extended length exposed in a fire detection zone and signal means actuated by said sensor when a critical temperature is reached over a substantial portion thereof, the combination therewith of a test circuit including means for heating a substantial portion of said sensor in said zone to its critical temperature and thereby causing actuation of said signal means.

2. The system of claim 1 wherein said test circuit electrically heats substantially the full length of said sensor from one end to the other.

3. The system of claim 1 wherein said test circuit includes means dividing the length of said sensor into a plurality of substantially equal electrical heating segments in parallel with each other in said test circuit.

4. The system of claim 1 having means for actuation thereof when said signal means is unactuated and means for deactuation thereof when said signal means is actuated and wherein said test circuit includes a highly damped ammeter in series with said sensor to indicate the average current therethrough and thereby the average temperature of the zone in which said sensor is exposed.

5. The system of claim 4 wherein said ammeter has a pair of contacts that are closed when particular current conditions obtain and a third circuit across said contacts containing indicator means for showing whether said contacts are closed.

6. A critical-temperature-detection system comprising an imperforate electrically conductive enclosure of extended length; heat-to-pressure transducing means for substantially increasing the pressure within said enclosure when said enclosure is externally heated; pressure-actuated switch means actuated by the pressure in said enclosure; an electrical warning circuit including, in series, a source of electrical current, signal means, said switch means, and return means from said switch means to said source, so that when said switch means is closed by a pressure increase in said enclosure it causes said circuit to actuate said signal means; and a test circuit including means for sending current through said enclosure for electrically heating said transducing means and thereby causing closure of said switch means and therefore acutation of said signal means.

7. The system of claim 6 wherein said test circuit sends current through substantially the full length of said enclosure from one end to the other.

8. The system of claim 6 wherein said test circuit includes means dividing the length of said enclosure into a plurality of substantially equal segments in parallel with each other in said test circuit.

9. A critical-temperature-detection system comprising an imperforate electrically conductive enclosure of extended length; heat-to-pressure transducing means for substantially increasing the pressure within said enclosure when said enclosure is externally heated; pressure-actuated first switch means actuated by the pressure in said enclosure; an electrical warning circuit including, in series, a first source of electrical current, signal means, said first switch means, and a first return line from said first switch means to said first source, so that when said first switch means is closed by a pressure increase in said enclosure it causes said warning circuit to actuate said signal means; and a test circuit including, in series, a second source of electrical current, an external switch, said conductive enclosure, and a second return line to said second source so that said transducing means can be electrically heated to cause closure of said first switch means and therefore actuation of said signal means.

10. The system of claim 9 wherein the power supplied to said test circuit is too low for sparking to ignite petroleum vapors.

11. A critical-temperature-detection system comprising an imperforate electrically conductive enclosure of extended length; heat-to-pressure transducing means for substantially increasing the pressure within said enclosure when said enclosure is externally heated; pressure-actuated first switch means actuated by the pressure in said enclosure; an ungrounded closed electrical warning circuit including, in series, a first source of electrical current, a relay having a normally closed second switch opened upon energization of said relay, signal means, said first switch means, and a first return line from said first switch means to said first source, so that when said first switch means is closed by a predetermined pressure increase in said enclosure it causes said warning circuit to actuate said signal means; and a test circuit including, in series, a second source of electrical current, said second switch, said conductive enclosure, a third switch, and a second return line for electrically heating said transducing means when said third switch is closed and thereby causing closure of said first switch means and therefore actuation of said signal means and said relay, with consequent opening of said second switch and cooling of said transducing means until said first switch means opens and second switch returns to its normally closed position, so that said test circuit causes periodic energization of said warning circuit while an ambient temperature sufficiently high, acting upon said enclosure, causes continuous operation of said warning circuit.

12. The system of claim 11 wherein said test circuit includes means for dividing the length of said enclosure into a plurality of substantially equal segments in parallel with each other.

13. The system of claim 11 wherein said test circuit includes an ammeter for indicating the current flow therethrough.

14. A critical-temperature-detection system comprising a plurality of imperforate electrically conductive enclosures of extended length; heat-to-pressure transducing means in each of said enclosures for substantially increasing the pressure within its enclosure when said enclosure is externally heated; a separated pressure-actuated switch means for each said enclosure closed when the pressure in its said enclosure reaches a predetermined value; an electrical warning circuit including a single first source of current and a plurality of parallel circuits connected to said first source, each parallel circuit including one said switch means and signal means, so that when any said switch means is closed by the predetermined pressure having been reached in its said enclosure it actuates its associated said signal means; and a test circuit having a second current source and means for sending current therefrom through one said enclosure at a time for electrically heating the transducing means therein and thereby causing closure of the associated said switch means and therefore actuation of the signal means associated with the last-named said signal means.

15. The system of claim 14 wherein said means for sending current through one said enclosure at a time includes a mechanical stepping switch.

16. The system of claim 14 wherein said warning circuit includes a relay energized upon closure of any said switch means and having a normally closed relay switch that is opened upon energization of said relay, said test circuit being connected through said relay switch so that closure of any said pressure-actuated switch means opens the test circuit.

17. A fire-detection system comprising an electrically conductive tube containing both a first gas and a transducing agent that releases large quantities of a second gas when heated to fire temperatures; an electrically conductive diaphragm; a housing divided by said diaphragm into two chambers, namely, a first chamber in communication with said first gas and said transducing agent and the second gas released therefrom and a second chamber isolated therefrom; an electrode in said second chamber adapted to be contacted by said diaphragm when the pressure in said first chamber reaches a predetermined value; a source of electrical current; a signal device in series with said source, said electrode, and said diaphragm, said signal device being actuated upon closure of said diaphragm against said electrode; a relay having a normally closed first switch and a normally open second switch; a return line connecting said relay in series with said diaphragm and said current source, so that said relay is actuated only when said diaphragm contacts said electrode; a second signal device in series with said second switch and actuated only upon its closure; a second power source; a third independently actuated switch connecting said power source to a terminal on said enclosure at a point distant from said diaphragm and to said first switch and, through said first switch, to a point on said enclosure closely adjacent said diaphragm, whereby on closure of said third switch current passes through said enclosure and heats said first gas thereby moving said diaphragm against said electrode and consequently actuating said signal device and said relay, thereby opening said first switch until said transducing agent cools.

18. In a critical-temperature-detection system having a continuous-type heat detecting sensor of extended length exposed in a fire detection zone, actuating means actuated by said sensor, and signal means operable by said actuating means when a critical temperatuure is reached, the combination therewith of a test circuit including heating means in said fire detection zone for raising the temperature of said sensor to a predetermined critical level and means responsive to said actuating means for controlling said heating means to sharply decrease the heating of said sensor when said critical temperature level is reached and to sharply increase the heating of said sensor when its temperature falls below said critical level.

19. The system of claim 18 wherein said means for controlling said heating means is a magnetic amplifier.

20. A critical-temperature-detection system comprising an imperforate electrically conductive enclosure of extended length; heat-to-pressure transducing means for substantially increasing the pressure within said enclosure when said enclosure is externally heated; pressure-actuated first switch means actuated by the pressure in said enclosure; an electrical warning circuit including, in series, a first source of electrical current, signal means, said first switch means, and a first return line from said first switch means to said first source, so that when said first switch means is closed by a pressure increase in said enclosure it causes said warning circuit to actuate said signal means; and a test circuit including a second source of electrical current, an external switch, a control means, lines connecting said second source and said conductive enclosure to said control means so that said transducing means can be electrically heated to cause closure of said first switch means and therefore actuation of said signal means, said control means also being connected to said first switch means through said signal means, and comprising means responsive to the closing of said first switch means for stopping the flow of current from said second source to said conductive enclosure.

21. The system as described in claim 20 including an ammeter connected in said test circuit between said control means and said conductive enclosure.

22. The system of claim 20 including a filament of high resistance conductive material wrapped around and along said conductive enclosure and insulated therefrom and connected at each filament end to said lines connected to said control means.

23. A critical-temperature-detection system comprising an imperforate electrically conductive enclosure of extended length; heat-to-pressure transducing means for substantially increasing the pressure within said enclosure when said enclosure is externally heated; first and second pressure-actuated switch means actuated by the pressure in said enclosure; an ungrounded closed electrical warning circuit including, in series, a first source of electrical current, signal means, said first switch means, and a first return line from said first switch means to said first source, so that when said first switch means is closed by a predetermined pressure increase in said enclosure it causes said warning circuit to actuate said signal means; and a test circuit including, in series, a second source of electrical current, said conductive enclosure, a second return line, and a third switch; control means for operating said third switch; and lines connecting said control means to said second switch means and to said first source of electrical current; whereby when said third switch is initially closed, said transducing means is electrically heated thereby causing closure of said second switch means and thereby actuation of said control means to open said third switch means to discontinue the heating of said transducer.

24. The system of claim 23 wherein said control means is a relay.

25. A critical-temperature-detection system comprising an imperforate electrically conductive enclosure of extended length; heat-to-pressure transducing means for substantially increasing the pressure within said enclosure when said enclosure is externally heated; pressure-actuated normally open first switch means and normally closed second switch means actuated by the pressure in said enclosure, said second switch means being operable at a lower pressure than said first switch means; an ungrounded closed electrical warning circuit including, in series, a first source of electrical current, signal means, said first switch means, and a first return line from said first switch means to said first source, so that when said first switch means is closed by a predetermined pressure increase in said enclosure it causes said warning circuit to actuate said signal means; and a test circuit including, in series, a second source of electrical current, said second normally closed switch, said conductive enclosure, a third switch, an ammeter, and a second return line, for electrically heating said transducing means when said third switch is closed; whereby when a predetermined temperature level is reached by said transducing means, said second switch will open to break the circuit through said testing circuit, and whereby said warning circuit is actuated by the closing of said first switch means at a higher pressure caused by a higher temperature than supplied to said transducer by said testing circuit.

26. A critical-temperature-detection system comprising an imperforate electrically conductive enclosure of extended length; heat-to-pressure transducing means for substantially increasing the pressure within said enclosure when said enclosure is externally heated; pressure-actuated first switch means actuated by the pressure in said enclosure; an ungrounded closed electrical warning circuit including, in series, a first source of electrical current, signal means, said first switch means, and a first return line from said first switch means to said first source, so that when said first switch means is closed by a predetermined pressure increase in said enclosure it causes said warning circuit to actuate said signal means; and a test circuit including, in series, a second source of electrical current, a second switch, said conductive enclosure, said first switch, and a second return line, said first switch being normally biassed in contact with said transducing means thereby closing the test circuit for electrically heating said transducing means when said second switch is closed, said first switch being actuated by pressure created by said second source, to open said testing circuit and also being further adapted to close said warning circuit.

References Cited by the Examiner

UNITED STATES PATENTS

| | | | |
|---|---|---|---|
| 706,177 | 8/1902 | Heaphy | 340—214 X |
| 1,056,459 | 3/1913 | Shepherd | 340—229 |
| 1,684,530 | 9/1928 | Bast | 200—140 |
| 2,063,703 | 12/1936 | Siddell et al. | 340—229 |
| 2,357,353 | 9/1944 | Pearce | 73—1 |
| 2,389,429 | 11/1945 | Griffith | 200—140 |
| 2,473,940 | 6/1949 | Clark | 340—214 |
| 2,493,351 | 1/1950 | Jones | 340—229 |
| 2,779,936 | 1/1957 | Loudon et al. | 340—213 X |
| 2,854,844 | 10/1958 | Howell | 73—1 |
| 2,943,304 | 6/1960 | Schmidt | 340—214 |
| 2,949,594 | 8/1960 | Tava et al. | 340—227 X |
| 3,014,205 | 12/1961 | Boehm | 340—214 |

NEIL C. READ, *Primary Examiner.*